(12) United States Patent
Rollet et al.

(10) Patent No.: US 8,451,167 B2
(45) Date of Patent: May 28, 2013

(54) METHODS OF CALCULATING THE POSITION OF A GNSS RECEIVER FROM TWO-FREQUENCY AND SINGLE-FREQUENCY PSEUDO-MEASUREMENTS

(75) Inventors: Stéphane Rollet, Chabeuil (FR);
Jean-Michel Perre, St. Peray (FR);
Nicolas Martin, Bourg les Valence (FR)

(73) Assignee: Thales, Neuilly sur Seine (FR)

( * ) Notice: Subject to any disclaimer, the term of this patent is extended or adjusted under 35 U.S.C. 154(b) by 406 days.

(21) Appl. No.: 12/748,138

(22) Filed: Mar. 26, 2010

(65) Prior Publication Data
US 2010/0245168 A1    Sep. 30, 2010

(30) Foreign Application Priority Data
Mar. 27, 2009 (FR) ...................... 09 01510

(51) Int. Cl.
*G01S 19/07* (2010.01)
*G01S 19/40* (2010.01)
(52) U.S. Cl.
CPC ...... *G01S 19/07* (2013.01); *G01S 19/40* (2013.01)
USPC .................. 342/357.44; 342/357.23
(58) Field of Classification Search
USPC ............... 342/357.23, 357.24, 357.44
See application file for complete search history.

(56) References Cited

U.S. PATENT DOCUMENTS

| | | | | |
|---|---|---|---|---|
| 5,867,411 | A * | 2/1999 | Kumar | 708/300 |
| 5,903,654 | A * | 5/1999 | Milton et al. | 342/357.23 |
| 8,085,196 | B2 * | 12/2011 | Whitehead | 342/357.44 |
| 2004/0135721 | A1 | 7/2004 | Hoven et al. | |
| 2005/0116857 | A1 * | 6/2005 | Martin et al. | 342/357.02 |
| 2005/0203702 | A1 | 9/2005 | Sharpe et al. | |
| 2011/0267228 | A1 * | 11/2011 | Talbot et al. | 342/357.27 |

OTHER PUBLICATIONS

Yunchun et al, L1 Backup Navigation for Dual Frequency GPS Receiver,) ION GPS/GNSS 2003, pp. 1258-1263.*
Wu et al, "An Optimal GPS Data Processing Technique for Precise Positioning," IEEE Trans. on Geoscience and Remote Sensing, vol. 31, No. 1, Jan. 1993, pp. 146-152.*
Yunchun Yang Et Ali: L1 Backup Navigation for Dual Frequency GPS Receiver, ION GPS/GNSS, XX, XX, Sep. 9, 2003, pp. 1258-1263, XP002330466.
Ouzeau C. Macabiau C; Roturier B; Mabilleau M; Azoulai L; Levan J; Besse F: "Iconospheric Delay Estimation in a Single Frequency Mode for Civilan Aviation", vol. 1, Sep. 29, 2008.

* cited by examiner

*Primary Examiner* — Gregory C Issing
(74) *Attorney, Agent, or Firm* — LaRiviere, Grubman & Payne, LLP (57) ABSTRACT

The method of determination of the position of a mobile receiver using at least four satellites of which at least one first satellite transmits a first signal on one frequency, the broadcasting of the first signal being single-frequency, and of which at least one second satellite transmits second and third signals respectively on a first and a second frequency, the broadcasting of the signals being two-frequency, the receiver including means for reception of at least two frequencies, makes it possible to determine the position by a calculation of at least four pseudo-distances corresponding to the distances between each satellite and the receiver. The calculation of a pseudo-distance at the first frequency includes a step of estimation of the inter-frequency bias between the first and second frequencies.

7 Claims, 4 Drawing Sheets

METHODS OF CALCULATING THE POSITION OF A GNSS RECEIVER FROM TWO-FREQUENCY AND SINGLE-FREQUENCY PSEUDO-MEASUREMENTS

PRIORITY CLAIM

This application claims priority to French Patent Application Number 09 01510, entitled Methods of Calculating the Position of a GNSS Receiver From Two-Frequency and Single-Frequency Pseudo-Measurements, filed Mar. 27, 2009.

FIELD OF THE INVENTION

The present invention concerns the field of satellite radio navigation systems and more particularly the determination of the position of a receiver using pseudo-distances measured on the basis of the signals sent by satellites. The field of the invention covers cases in which a mobile receiver calculates its position from signals received from a set of satellites of which one sub-set includes satellites that send single-frequency signals and a second sub-set includes satellites that send two-frequency signals.

BACKGROUND OF THE INVENTION

At present, satellite location of a mobile receiver is effected by the measurement of pseudo-distances. These measurements are generally biased by the clock error of the receiver. This error can be eliminated provided that an additional measurement is added, i.e. provided that at least four satellite measurements are available.

The pseudo-distance measurements are subject to errors linked to the receiver, caused in particular by thermal noise and by propagation in the atmosphere that causes different time-delays according to the satellites.

One of the dominant sources of error is the time-delay caused by the ionosphere. Nevertheless, there exist models, such as the models known as "Klobuchar" or "Nequick", providing corrections as a function of the position of the receiver and the satellites, but these can at best correct 50% of errors.

In prior art solutions, location of a global navigation satellite system (GNSS) receiver employs satellite signals that are generally single-frequency signals. The measurements of the position of a GNSS receiver are then limited in terms of accuracy.

A powerful technique for correcting the ionospheric error consists in sending two signals per satellite on different carrier frequencies. The ionospheric delay being inversely proportional to the square of the frequency, the propagation time difference observed between the two frequencies can be used to work back to the ionospheric error and to subtract it from the measurements.

The current GPS system uses signals L1 and L2 that can benefit from this error correction technique. On the other hand, access to the signals L2 is effected either via encrypted codes or via a "semi-codeless" technique offering lower performance. Moreover, the L2 band is not certified for aeronautical applications, and so this method is not used at present for civil aviation, for example.

The deployment of GNSS systems, such as the Galileo and modernized GPS systems, will generalize two-frequency signals in the ARNSS (Aeronautical Radio Navigation Satellite Service) bands. It will further enable all receivers to offer the possibility of correcting ionospheric errors to improve GNSS receiver positioning.

Existing two-frequency receivers use two separate analogue channels a and b to process the two frequencies Fa and Fb. For example, GPS receivers for civil aviation use the frequency L1 substantially equal to 1575.42 MHz and the frequency L5 substantially equal to 1176.45 MHz. Galileo receivers use the frequency L1 and the frequency E5$b$ substantially equal to 1207.14 MHz.

Whatever frequencies are used, when the two-frequency receivers receive two signals, the propagation times Ba and Bb in each of the analogue channels of the receiver can be different. The effect of this is to introduce a bias into the estimate of the ionospheric error for each satellite based on the propagation time difference between the two frequencies.

If all the measurements used to resolve the position of two-frequency signals, and this bias is thus found to be identical for all the satellites, there is no effect on the position. In this case the resolution position, velocity and time (PVT) algorithm introduces this bias on account of the clock error of the receiver.

However, certain situations, concerning the determination of the position of a GNSS receiver, necessitate the ability to use mixed single-frequency and two-frequency measurements to resolve the position of the receiver.

These situations arise in particular during the transient phase of replacement of the satellites of a constellation, the old single-frequency satellites being progressively replaced by two-frequency satellites.

These situations also arise in the case of interference in one of the two bands, notably if the level of interference has the consequence of causing a few of the weakest satellites to become desynchronized. Ionospheric scintillation can momentarily desynchronize one of the two frequencies on some satellites.

The choice to use single-frequency measurements, less accurate because of the ionospheric correction based on a model, at the same time as two-frequency measurements is justified by the resulting improvement in terms of satellite geometry, also known as GDOP (geometric dilution of precision).

The single-frequency measurements must nevertheless be weighted with a variance representative of the real error including the residual ionospheric error after application of the ionospheric model.

However, although single-frequency and two-frequency satellite measurements enable the position of a GNSS receiver to be determined, the inter-frequency bias in the HF channels of a two-frequency receiver can induce a high error in the resolved position.

One object of the invention is to alleviate the aforementioned drawbacks.

SUMMARY OF THE INVENTION

Furthermore, one object of the invention is to reduce the GNSS receiver position measurement error. The invention makes it possible to estimate the inter-frequency difference in the HF channels of a two-frequency receiver thanks to the measurements provided by the signals from the satellites. The invention makes it possible to estimate the value of the HF inter-frequency bias and to compensate the position errors of the receiver.

Moreover, the invention makes it possible to compensate this difference in the two-frequency measurements without considering the ionospheric error before or after the calculation of the position of the point.

In the description, the term "iono-free" measurement refers to a two-frequency measurement of the position with no ionospheric error. This designation applies notably to the pseudo-distances in which the ionospheric error is eliminated by a linear combination of the measurements of the same satellite on the two frequencies.

The invention makes it possible to produce an estimate of the inter-frequency bias in real time before each resolution of a position or during a calibration phase.

Each time that a large number of two-frequency measurements is available, calibration can be undertaken. The calibration error is minimized by averaging the measurements between the satellites and over time.

The method for determination of the position of a mobile receiver using at least four satellites of which at least one first satellite, known as a single-frequency satellite, transmits a first signal on a first frequency $F_a$, and of which at least one other satellite, known as a two-frequency satellite, transmits second and third signals respectively on the first frequency $F_a$ and on a second frequency $F_b$, is advantageously executed by a receiver including means for receiving at least two frequencies $F_a$, $F_b$. The determination of the position of the receiver comprises the calculation of at least four pseudo-distances corresponding to the distances between each satellite and the receiver.

The calculation of the position of the receiver includes a step of estimation of the inter-frequency bias, denoted $\Delta B_{HF}$, of the two-frequency signals received in the HF channels of the receiver, the estimated bias being denoted $\Delta B_{estimated}$, the calculation of the inter-frequency bias making it possible to compensate the measurements of the single-frequency or two-frequency pseudo-distances.

The average estimated inter-frequency bias between the two-frequency signals received by the receiver is advantageously equal to:

$$\Delta B_{estimated} \stackrel{def}{=} \frac{1}{(N-1)} \sum_{i=2}^{N} (pd_{ib\ meas} - pd_{ia\ meas}),$$

where $i \in [2, N]$ are two-frequency satellites and $pd_{ia\text{-}meas}$ is the pseudo-distance between the satellite i and the receiver measured on the first frequency ($F_a$) and $pd_{ib\text{-}meas}$ is the pseudo-distance between the satellite i and the receiver measured on the second frequency ($F_b$).

Advantageously, the average estimated inter-frequency bias between the two-frequency signals received by the receiver is equal to:

$$\Delta B_{estimated} = \Delta B_{HF} - \frac{1}{\beta} B_{iono\ avg} + v_{avg},$$

where:

$$B_{iono\ avg} = \frac{1}{(N-1)} \sum_{i=2}^{N} B_{iono\ ia};$$

$$v_{avg} = \frac{1}{(N-1)} \sum_{i=2}^{N} (v_{ib} - v_{ia});$$

where:
[2, N] are satellites transmitting two-frequency signals;
$\Delta B_{HF}$ is the analogue inter-frequency bias in the receiver means of the receiver, i.e. between the channels a and b of the receiver;
$v_{ix}$ is the measurement error with no delay linked to passing through the ionosphere on the frequency x for the satellite i;
$B_{iono\text{-}ia}$ is the group delay caused by passing through the ionosphere between the satellite i and the receiver on the frequency Fa, the group delay being equal to $TEC_1/F_a^2$, where TEC is the total electrical content;
$\beta$ is a first constant equal to the ratio between the second frequency square divided by the difference between the squares of the first and second frequencies, with $\beta = F_b^2/(F_b^2 - F_a^2)$.

The average estimated inter-frequency bias between the two-frequency signals received by the receiver is advantageously equal to:

$$\Delta B_{filtered\ estimate}(n) \stackrel{def}{=} \left(1 - \frac{1}{\tau}\right) \Delta B_{filtered\ estimate}(n-1) + \frac{1}{\tau} \Delta B_{estimated}(n),$$

where $\tau$ is a time constant and where n is a sampling index with a period less than the correlation of the ionospheric delay.

The calculation of the position of the receiver advantageously includes a step of compensation of the inter-frequency bias in the I-IF channels of the receiver between the first and second frequencies on a first set of two-frequency pseudo-distances, the compensation step comprising the calculation of a corrective factor equal to the product of the estimated inter-frequency bias $\Delta B_{estimated}$ and the first constant $\beta$.

The step of compensation of the inter-frequency bias in the HF channels of the receiver between the first and second frequencies of the first set of pseudo-distances advantageously comprises the calculation of a pseudo-distance ($pd_{i\text{-}meas}$) known as the iono-free pseudo-distance, in which the bias of two-frequency signals caused by passing through the ionosphere is corrected.

The step of compensation of the first set of pseudo-distances advantageously comprises the calculation of iono-free pseudo-distances equal, for each two-frequency satellite, to:

$$pd_{i\text{-}meas} = (F_a^2 \cdot pd_{ia\text{-}meas} - F_b^2 \cdot pd_{i\text{-}meas})/(F_a^2 - F_b^2).$$

Advantageously, an iono-free pseudo-distance is equal, for each two-frequency satellite, to:

$$pd_{i\ meas} = pd_i + \Delta t + v_i;$$

where:
$pd_i$ is the real pseudo-distance between the satellite i and the receiver;
$\Delta t$ is an unknown comprising the receiver clock bias;
$v_i$ is an error in the measurement of the iono-free pseudo-distances for the satellite i.

The step of compensation of the inter-frequency bias advantageously comprises the definition, for each two-frequency satellite, of a corrected pseudo-distance that is equal to the value of the iono-free pseudo-distance less the corrective factor. Using at least four satellites of which at least one second single-frequency satellite transmits a signal on the second frequency, the step of compensation of the inter-frequency bias advantageously comprises:

a first definition, for each two-frequency satellite, of a corrected pseudo-distance that is equal to the value of the iono-free pseudo-distance less the corrective factor; and a second definition, for the second single-frequency satellite, of a corrected pseudo-distance that is equal to the value of the measured pseudo-distance less the value of the estimated inter-frequency bias.

Using at least four satellites of which at least one second single-frequency satellite transmits a signal on the second frequency, the step of compensation of the inter-frequency bias advantageously comprises:

a third definition, for the first single-frequency satellite, of a corrected pseudo-distance that is equal to the value of the pseudo-distance measured at the frequency $F_a$ plus the corrective factor; and a fourth definition, for the second single-frequency satellite, of a corrected pseudo-distance that is equal to the value of the pseudo-distance measured at the frequency $F_b$;

plus the corrective factor; and
less the value of the estimated inter-frequency bias.

BRIEF DESCRIPTION OF THE DRAWINGS

Other features and advantages of the invention will become apparent in the light of the following description, given with reference to the appended drawings, in which.

DETAILED DESCRIPTION OF THE INVENTION

The present description considers first of all the calculation of pseudo-distances when the measurements come from two-frequency measurements, i.e. all the satellites transmit two signals on two different frequencies.

This first consideration makes it possible to estimate the increase in the variance of measurement noise independent of errors linked to the ionosphere in a configuration where all the satellites are two-frequency satellites.

Figure 1:
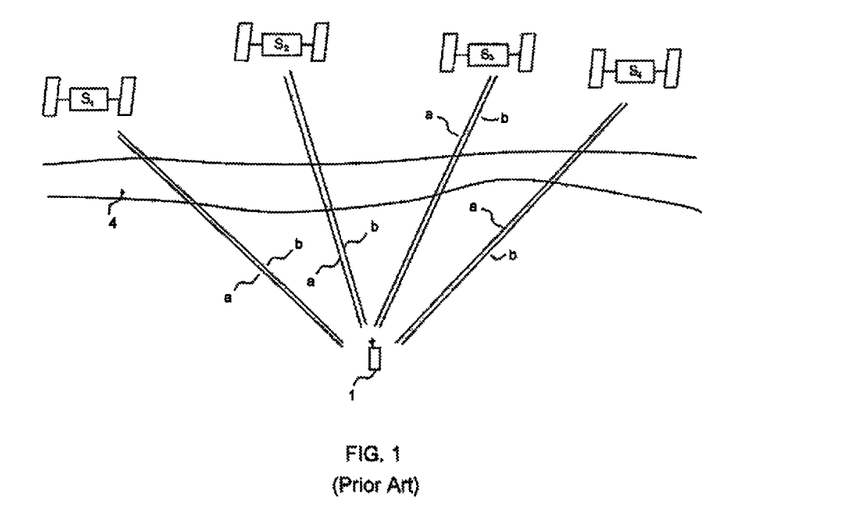
FIG. 1 shows configuration of a GNSS receiver receiving signals from a plurality of two-frequency satellites.

FIG. 1 represents the situation in which a GNSS receiver 1 receives signals 2, 3 from four satellites S1, S2, S3, S4.

Each of the received signals 2, 3 passes through the ionosphere 4.

A pseudo-distance measured between a satellite $S_i$ and a GNSS receiver $R_{GNSS}$ is divided into a real value of the distance and a set of adjustment parameters allowing for the receiver clock bias, the bias introduced by the HF channels on the carrier frequency, the bias linked to the ionosphere, and the bias corresponding to measurement errors excluding the ionospheric delay.

The pseudo-distance measured at the frequency "a" between the satellite i and the GNSS receiver is denoted $pdi_{a\ meas}$. The real distance between the satellite i and the GNSS receiver is denoted $pd_i$.

The following equations apply for $\{1; N\}$ satellites used in the models for estimating the measurement of a pseudo-distance for the situation of a GNSS receiver:

$$pd_{1a\ meas} = pd_1 + \Delta t_h + B_a + B_{iono\ 1a} + v_{1a} B_{iono\ 1a} = TEC_1/F_a^2$$

$$pd_{1b\ meas} = pd_1 + \Delta t_h + B_b + B_{iono\ 1b} + v_{1b} B_{iono\ 1b} = TEC_1/F_b^2$$

$$pd_{2a\ meas} = pd_2 + \Delta t_h + B_a + B_{iono\ 2a} + v_{2a} B_{iono\ 2a} = TEC_2/F_a^2$$

$$pd_{2b\ meas} = pd_2 + \Delta t_h + B_b + B_{iono\ 2b} + v_{2b} B_{iono\ 2b} = TEC_2/F_b^2$$

...

$$pd_{Na\ meas} = pd_N + \Delta t_h + B_a + B_{iono\ Na} + v_{Na} B_{iono\ Na} = TEC_N/F_a^2$$

$$pd_{Nb\ meas} = pd_N + \Delta t_h + B_b + B_{iono\ Nb} + v_{Nb} B_{iono\ Nb} = TEC_N/F_b^2$$

Where:
  $pd_{Na\ meas}$ is the pseudo-distance measured at the frequency x, with x=a or b, for the satellite i
  $pd_i$ is the real distance between the satellite i and the receiver
  $pd_i = \sqrt{(x-x_i)^2 + (y-y_i)^2 + (z-z_i)^2}$
  (x,y,z) is the position of the receiver
  $(x_i,y_i,z_i)$ is the position of satellite number i
  $\Delta t_h$ is the receiver clock bias expressed in metres, the calculated value relating to a distance is: $c \cdot \Delta t_h$ $$\frac{TEC_i}{Fx^2}$$

is the group delay caused by the ionosphere, expressed in metres for satellite number i
  TECi is the total electrical content for satellite number i
  $F_x^2$ is the frequency of the carrier x, with x=a or b
  $B_x$ is the bias introduced by the HF channel on the frequency x, with x=a or b, expressed in metres
  $\Delta B_{HF}$ is the analogue inter-frequency bias between the channels a and b, expressed in metres (this is the bias introduced by the HF channel of the receiver between the two paths a and b)
  $\Delta B = B_b - B_a$
  $v_{ix}$ is the measurement error excluding the ionospheric delay on the frequency x for satellite number i The pseudo-measurements can thus also be written:

$$pd_{1a\ meas} = Pd_1 + \Delta t_h + B_a + B_{iono\ 1a} + v_{1a} B_{iono\ 1a} = TEC_1/F_a^2$$

$$pd_{1b\ meas} = pd_1 + \Delta t_h + B_a + \Delta B_{HF} + B_{iono\ 1b} + v_{1b} B_{iono\ 1b} = TEC_1/F_b^2$$

$$pd_{2a\ meas} = pd_2 + \Delta t_h + B_a B_{iono\ 2a} + v_{2a} B_{iono\ 2a} = TEC_2/F_a^2$$

$$pd_{2b\ meas} = pd_2 + \Delta t_h + B_a + \Delta B_{HF} + B_{iono\ 2b} + v_{2b} B_{iono\ 2b} = TEC_2/F_b^2$$

...

$$pd_{Na\ meas} = pd_N + \Delta t_h + B_a + B_{iono\ Na} + v_{Na} B_{iono\ Na} = TEC_N/F_a^2$$

$$pd_{Nb\ meas} = pd_N + \Delta t_h + B_a + \Delta B_{HF} + B_{iono\ Nb} + v_{Nb} B_{iono\ Nb} = TEC_N/F_b^2$$

A dominant source of errors is the component of the inter-frequency bias resulting from passing through the ionosphere.

In order to determine the variance of the measurement noise independently of ionospheric errors, the invention can be used to estimate a magnitude relating to a pseudo-distance by eliminating the terms $B_{iono\ 1a}$ and $B_{iono\ 1b}$.

From two-frequency measurements it is possible to eliminate the error linked to the ionospheric delay. It is a question of determining the terms $B_{iono\ ia}$ and $B_{iono\ ib}$ for the satellite i.

The following expressions are obtained for a new magnitude linked to a pseudo-distance denoted $pd_{i\ meas}$ for the satellite i:

$$pd_{1\ meas} = (F_a^2 \cdot pd_{1a\ meas} - F_b^2 \cdot pd_{1b\ meas})/(F_a^2 - F_b^2)$$

$$pd_{2\ meas} = (F_a^2 \cdot pd_{1a\ meas} - F_b^2 \cdot pd_{1b\ meas})/(F_a^2 - F_b^2)$$

$$\ldots$$

$$pd_{N\ meas} = (F_a^2 \cdot pd_{1a\ meas} - F_b^2 \cdot pd_{1b\ meas})/(F_a^2 - F_b^2)$$

The pseudo-distance $pd_{i\ meas}$ is i also called the "iono-free" pseudo-distance in the remainder of the description.

The following equations are thus obtained by replacing the values of $pd_{1a\ meas}$ and $pd_{1b\ meas}$:

$$pd_{1\ meas} = pd_1 + (\Delta t_h + B_a) + \beta \cdot \Delta B_{HF} + (\alpha \cdot v_{1a} + \beta \cdot v_{1b})$$

$$pd_{2\ meas} = pd_2 + (\Delta t_h + B_a) + \beta \cdot \Delta B_{HF} + (\alpha \cdot v_{2a} + \beta \cdot v_{2b})$$

$$\ldots$$

$$pd_{N\ meas} = pd_N + (\Delta t_h + B_a) + \beta \cdot \Delta B_{HF} + (\alpha \cdot v_{Na} + \beta \cdot v_{Nb})$$

Where:
$\alpha = Fa^2/(Fa^2 - Fb^2)$
$\beta = Fb^2/(Fb^2 - Fa^2)$
$\alpha + \beta = 1$ The following simplified expressions are obtained for the iono-free pseudo-distances:

$$p_{1\ meas} = pd_1 + \Delta t + v_1$$

$$pd_{2\ meas} = pd_2 + \Delta t + v_2$$

$$pd_{N\ meas} = pd_N + \Delta t + v_N$$

Where:
$\Delta t$ is the new unknown replacing $\Delta t h$ $$\Delta t = \Delta t h + B_a + \beta \cdot \Delta B_{HF}$$

$v_i$ is the "iono-free" measurement error for satellite number i $$vi = \alpha \cdot v_{ia} + \beta \cdot v_{ib}$$

It is possible to obtain the variance of the associated measurement noises:

$$\sigma_i^2 = \text{var}[v_i]$$

$$\sigma_i^2 = \alpha^2 \cdot \text{var}[v_{ia}] + \beta^2 \cdot \text{var}[v_{ib}]$$

$$\sigma_i^2 = \alpha^2 \cdot \sigma_a^2 + \beta^2 \cdot \sigma_b^2$$

If $\text{var}[v_{ia}] = \sigma_a^2$ and $\text{var}[v_{ib}] = \sigma_b^2$ for all the satellites, and if $\sigma_a^2 = \sigma_b^2$, then: $\sigma_i^2 = (\alpha^2 + \beta^2) \cdot \sigma^2$ A numerical application, with the following parameters:
$F_a = F_{L1} = 1575.42$ MHz
$F_b = F_{E5b} = 1207.14$ MHz, gives the following orders of magnitude for the values of $\alpha$ and $\beta$:
$\alpha = 4.28$
$\beta = -3.28$ The standard deviation of the iono-free measurement noise is amplified relative to the single-frequency measurements by a factor:

$$\sqrt{\alpha^2 + \beta^2} = 5.32$$

Eliminating the error caused by the dominant ionospheric delay justifies accepting degraded measurement noise.

In the situation where there are only iono free measurements:

$$\begin{bmatrix} pd_{1\ meas} - pd_{1\ calculated} \\ pd_{2\ meas} - pd_{2\ calculated} \\ \vdots \\ pd_{N\ meas} - pd_{N\ calculated} \end{bmatrix} = \begin{bmatrix} \cos\theta_{1x} & \cos\theta_{1y} & \cos\theta_{1z} & 1 \\ \cos\theta_{2x} & \cos\theta_{2y} & \cos\theta_{2z} & 1 \\ \vdots & \vdots & \vdots & 1 \\ \cos\theta_{Nx} & \cos\theta_{Ny} & \cos\theta_{Nz} & 1 \end{bmatrix} \begin{bmatrix} x - x_0 \\ y - y_0 \\ z - z_0 \\ \Delta t \end{bmatrix} + \begin{bmatrix} v_1 \\ v_2 \\ \vdots \\ v_N \end{bmatrix}$$

The pseudo-distance $pd_{i\ calculated}$ is that calculated between the satellite i and the GNSS receiver. It can correspond, for example, to the value of the theoretical measurement predicted from the position previously resolved.

$$Pd_{i\ calculated} = \sqrt{(x_0 - x_i)^2 + (y_0 - y_i)^2 + (z_0 - z_i)^2}$$

The coordinates $x_0$, $y_0$, $z_0$ correspond to the a priori estimated position of the antenna of the receiver.

Thus the difference $\Delta pd_i$ between the measured pseudo-distance and the calculated pseudo-distance between the satellite i and the GNSS receiver is introduced.

$$\begin{bmatrix} \Delta pd_1 \\ \Delta pd_2 \\ \vdots \\ \Delta pd_N \end{bmatrix} = H \begin{bmatrix} \Delta x \\ \Delta y \\ \Delta z \\ \Delta t \end{bmatrix} + \begin{bmatrix} v_1 \\ v_2 \\ \vdots \\ v_N \end{bmatrix}$$

Denoting:

$$H = \begin{bmatrix} \cos\theta_{1x} & \cos\theta_{1y} & \cos\theta_{1z} & 1 \\ \cos\theta_{2x} & \cos\theta_{2y} & \cos\theta_{2z} & 1 \\ \vdots & \vdots & \vdots & 1 \\ \cos\theta_{Nx} & \cos\theta_{Ny} & \cos\theta_{Nz} & 1 \end{bmatrix}$$

The following equation is resolved in the least squares sense:

$$\begin{bmatrix} \Delta x_{estimated} \\ \Delta y_{estimated} \\ \Delta z_{estimated} \\ \Delta t_{estimated} \end{bmatrix} = H^* \begin{bmatrix} \Delta pd_1 \\ \Delta pd_2 \\ \vdots \\ \Delta pd_N \end{bmatrix}$$

where $$H^* = (H^T W^T W H)^{-1} H^T W^T$$

and $$W = \begin{bmatrix} 1/\sigma_1^2 & 0 & \ldots & 0 \\ 0 & 1/\sigma_2^2 & 0 & \vdots \\ \vdots & 0 & \vdots & 0 \\ 0 & \ldots & 0 & 1/\sigma_N^2 \end{bmatrix}$$

The biases $Ba$ and $\beta \cdot \Delta B_{HF}$ introduced by the HF channel are common to the satellites and can therefore be integrated into the clock error $\Delta t h$ with the equation $\Delta t = \Delta t h + Ba + \beta \cdot \Delta B_{HF}$, where $\Delta t$ is a new unknown.

The clock error is an unknown of the system to be resolved. Introducing the bias $Ba$ and the bias $\beta \cdot \Delta B_{HF}$ into the clock error Δth amounts to effecting a change of variable corresponding to a new noise Δt to be determined.

The biases $B_a$ and $\beta \cdot \Delta B_{HF}$ thus have no effect on the x, y, z position measurement.

This hypothesis makes it necessary to consider that there are only two-frequency measurements.

On the other hand, in the framework of the invention, the receiver has single-frequency measurements for certain satellites and two-frequency measurements for others.

To simplify the writing of the equations, the following calculations correspond to the particular case where only satellite 1 is single-frequency. The situation of a plurality of single-frequency satellites is treated in a similar way.

For the single-frequency satellite, the expression for the measured pseudo-distance is considered. Where the two-frequency satellites are concerned, the iono-free pseudo-distances are considered:

$pd_{1a\,meas} = pd_1 + (\Delta t_h + B_a) + B_{iono\,1a} + v_{1a}$ Single-frequency satellite a $pd_{2\,meas} = pd_2 + (\Delta t_h + B_a) + \beta \cdot \Delta B_{HF} + v_2$ Two-frequency satellite $pd_{N\,meas} = pd_N + (\Delta t_h + B_a) + \beta \cdot \Delta B_{HF} + v_N$ Two-frequency satellite Note that $pd_{1a\,meas}$ explicitly causes to appear a term linked to passing through the ionosphere: $B_{iono\,1a}$.

An advantage of the invention is to reduce the effect of the inter-frequency bias caused by the HF channels in the two-frequency GNSS receiver. Another advantage of the invention is that the residual ionospheric noise when single-frequency and two-frequency satellites enable a GNSS receiver to be located.

The equation for $pd_{1a\,mes}$ can also be written:

$pd_{1a\,meas} = pd_1 + (\Delta t_h + B_a) + \beta \cdot \Delta B_{HF} + v_1 + B_{iono\,1a} - \beta \cdot \Delta B_{HF} + (v_{1a} - v_1)$ $pd_{1a\,meas} = pd_{1\,meas} + b_{1a}$ We set:

$$\begin{bmatrix} pd_{1a\,meas} - pd_{1\,calculated} \\ pd_{2\,meas} - pd_{2\,calculated} \\ \vdots \\ pd_{N\,meas} - pd_{N\,calculated} \end{bmatrix} = \begin{bmatrix} pd_{1\,meas} - pd_{1\,calculated} \\ pd_{2\,meas} - pd_{2\,calculated} \\ \vdots \\ pd_{N\,meas} - pd_{N\,calculated} \end{bmatrix} + \begin{bmatrix} b_{1a} \\ 0 \\ \vdots \\ 0 \end{bmatrix}$$

$$\begin{bmatrix} pd_{1a\,meas} - pd_{1\,calculated} \\ pd_{2\,meas} - pd_{2\,calculated} \\ \vdots \\ pd_{N\,meas} - pd_{N\,calculated} \end{bmatrix} =$$

$$\begin{bmatrix} \cos\theta_{1x} & \cos\theta_{1y} & \cos\theta_{1z} & 1 \\ \cos\theta_{2x} & \cos\theta_{2y} & \cos\theta_{2z} & 1 \\ \vdots & \vdots & \vdots & \vdots \\ \cos\theta_{Nx} & \cos\theta_{Ny} & \cos\theta_{Nz} & 1 \end{bmatrix} \begin{bmatrix} x - x_0 \\ y - y_0 \\ z - z_0 \\ \Delta t \end{bmatrix} + \begin{bmatrix} v_1 \\ v_2 \\ \vdots \\ v_N \end{bmatrix} + \begin{bmatrix} b_{1a} \\ 0 \\ \vdots \\ 0 \end{bmatrix}$$

The pseudo-distance $Pd_{i\,calculated}$ is introduced into the equations in order to estimate the error in the evaluation of the position of the GNSS receiver. This pseudo-distance corresponds to a value of the pseudo-distance calculated at a time preceding the calculation of the pseudo-distance $pd_{i\,meas}$, for example. A convergent algorithm can be used, for example. In a different embodiment, it can be the pseudo-distance predicted from another calculation.

Where:

$b_{1a} = B_{iono\,1a} - \beta \cdot \Delta B_{HF} + (v_{1a} - v_1)$ $(v_{1a} - v_1) = (\alpha - 1) \cdot v_{1a} - \beta \cdot v_{1b} = \beta \cdot (v_{1a} - v_{1b})$ The following simplified expression is then obtained from the foregoing calculations in the two-frequency satellite situation:

$$\begin{bmatrix} \Delta pd_{1a} \\ \Delta pd_2 \\ \vdots \\ \Delta pd_N \end{bmatrix} = H \begin{bmatrix} \Delta x \\ \Delta y \\ \Delta z \\ \Delta t \end{bmatrix} + \begin{bmatrix} v_1 \\ v_2 \\ \vdots \\ v_N \end{bmatrix} + \begin{bmatrix} b_{1a} \\ 0 \\ \vdots \\ 0 \end{bmatrix}$$

Resolving:

$$\begin{bmatrix} \Delta x_{estimated} \\ \Delta y_{estimated} \\ \Delta z_{estimated} \\ \Delta t_{estimated} \end{bmatrix} = H^* \begin{bmatrix} \Delta pd_{1a} \\ \Delta pd_2 \\ \vdots \\ \Delta pd_N \end{bmatrix} = H^* \left( \begin{bmatrix} \Delta pd_1 \\ \Delta pd_2 \\ \vdots \\ \Delta pd_N \end{bmatrix} + \begin{bmatrix} b_{1a} \\ 0 \\ \vdots \\ 0 \end{bmatrix} \right)$$

Introducing an additional error equal to:

$$\begin{bmatrix} \varepsilon x_{estimated} \\ \varepsilon y_{estimated} \\ \varepsilon z_{estimated} \\ \varepsilon t_{estimated} \end{bmatrix} = H^* \begin{bmatrix} b_{1a} \\ 0 \\ \vdots \\ 0 \end{bmatrix}$$

Where: $b_{1a} = B_{iono\,1a} - \beta \cdot \Delta B_{HF} + \beta \cdot (v_{1a} - v_{1b})$ The bias introduced on the position can be very large because of the inter-frequency bias $\Delta B$ amplified by the coefficient $\beta$, in addition to the uncorrected ionospheric error on the single-frequency satellite.

The order of magnitude of $B_{iono\,1a}$ is 20 metres.
The order of magnitude of $\Delta B_{HF}$ is 20 metres.
The order of magnitude of $\beta \cdot \Delta B_{HF}$ is therefore 60 metres, given the values of $\alpha$ and $\beta$ calculated beforehand.

Figure 2:
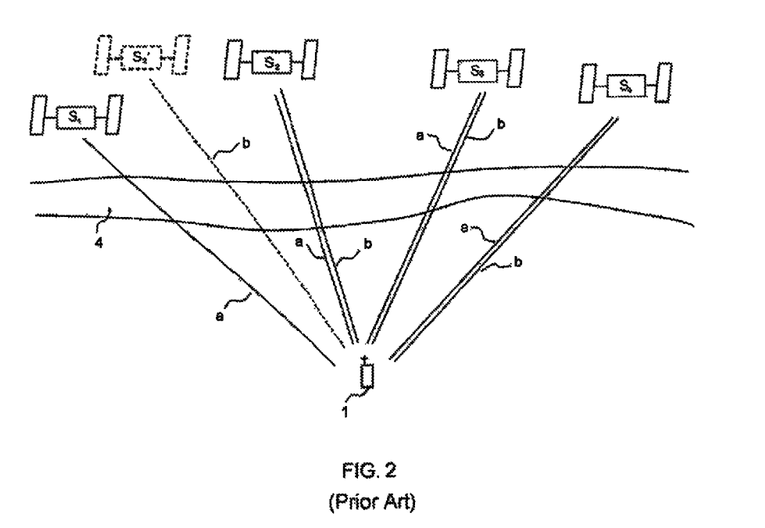
FIG. 2 shows configuration of a GNSS receiver receiving signals from a plurality of two-frequency satellites and at least one single-frequency satellite.

The invention makes it possible on the one hand to estimate the inter-frequency bias and on the other hand to correct it in the configuration in which the position of a GNSS receiver is calculated from single-frequency satellites and two-frequency satellites, corresponding for example to the FIG. 2 situation.

FIG. 2 represents a GNSS receiver 1 receiving signals 2, 3 from three two-frequency satellites $S_2$, $S_3$, $S_4$ and a signal 2 from a single-frequency satellite $S_1'$. All the signals transmitted pass through the ionosphere 4.

A variant of the invention makes it possible to deal with the situation of a plurality of single-frequency satellites. Single-frequency satellites transmit either signals on a first frequency 2 or signals on a second frequency 3. One embodiment represents a second single-frequency satellite $S_2'$ transmitting on a frequency 3 different from the frequency of the first single-frequency satellite $S_1'$.

Depending on the number of single-frequency and two-frequency satellites, the invention makes it possible to process the various situations, notably the situation of pseudo-distances compensated by the inter-frequency bias of the HF channels of the receiver.

The remainder of the description covers the various situations in detail.

A first instantaneous estimate of the inter-frequency bias can be expressed by an average of the measurements of the signals coming from the two-frequency satellites:

$$\Delta B_{estimated} \stackrel{def}{=} \frac{1}{(N-1)} \sum_{i=2}^{N} (pd_{ib\ meas} - pd_{ia\ meas})$$

The inter-frequency bias is divided into a part represented by the inter-frequency bias between the paths of the HF channels of the receiver, a part represented by the ionospheric inter-frequency bias, and a part comprising measurement errors excluding the ionospheric delay.

Because it is not possible to dissociate in the estimation of the inter-frequency bias the component linked to the analogue inter-frequency bias of the HF channels from the bias linked to passing through the ionosphere and the errors linked to measurement noise, all of the inter-frequency bias is taken into account in the estimation.

The following literal expression is obtained:

$$\Delta B_{estimated} =$$

$$\Delta B_{HF} + \frac{1}{(N-1)} \sum_{i=2}^{N} (B_{ionob} - B_{ionoa}) + \frac{1}{(N-1)} \sum_{i=2}^{N} (v_{ib} - v_{ia})$$

$$\Delta B_{estimated} = \Delta B_{HF} - \frac{1}{\beta} B_{ionoavg} + v_{avg}$$

$$B_{ionoavg} = \frac{1}{(N-1)} \sum_{i=2}^{N} B_{ionoa}$$

$$v_{avg} = \frac{1}{(N-1)} \sum_{i=2}^{N} (v_{ib} - v_{ia})$$

$$B_{ionoib} - B_{ionoia} = TEC_i (1/F_b^2 - 1/F_a^2)$$

$$B_{ionoib} - B_{ionoia} = TEC_i / F_a^2 \cdot (F_a^2 - F_b^2) / F_b^2$$

$$B_{ionoib} - B_{ionoia} = -TEC_i / F_a^2 / \beta$$

$$B_{ionoib} - B_{ionoia} = -B_{ionoia} / \beta$$

In another embodiment of the invention, it is possible to calculate the estimate of the inter-frequency bias taking into account the position of the satellite. The estimate is biased by the ionospheric delay, the amplitude of which depends on the elevation of the satellite. The obliqueness of the optical path relative to the ionospheric layer is taken into account in the estimation process. High satellites have a lower ionospheric delay. It is possible to assign them a higher coefficient in a weighted average:

In another embodiment of the invention it is possible to calculate the error caused by the inter-frequency bias by filtered estimation.

A first order filter is applied to the instantaneous estimate, with a time constant $\tau$ representative of the evolution of the inter-frequency bias.

The following equation is obtained:

$$\Delta B_{filtered\ estimate}(n) \stackrel{def}{=} \left(1 - \frac{1}{\tau}\right) \Delta B_{filtered\ estimate}(n-1) + \frac{1}{\tau} \Delta B_{estimated}(n)$$

The measurements are sampled at different times with index n with a period less than the correlation of the ionospheric delay. An order of magnitude of the sampling is of the order of 1000 seconds in a preferred embodiment.

The ionospheric error is then averaged.

In another embodiment, simple averaging gives the following equation:

$$\Delta B_{filtered\ estimate}(n) \stackrel{def}{=} \frac{1}{K} \sum_{k=n-K+1}^{k=n} \Delta B_{estimated}(k)$$

The invention makes it possible to estimate the inter-frequency bias and also to correct that error in the two-frequency or single-frequency measurements.

One embodiment of the invention makes it possible to compensate the value of the bias estimated over only the two-frequency measurements.

Retaining the above notation and considering for the purposes of this example a single single-frequency satellite transmitting on the frequency Fa and a plurality of two-frequency satellites transmitting on the frequencies Fa and Fb. The following equations apply with the calculation of the instantaneous estimate of the inter-frequency bias:

$$pd_{1a\ meas} = Pd_{1a\ meas}$$

$$pd_{2\ meas}' = pd_{2\ meas} - \beta \cdot \Delta B_{estimated}$$

$$\ldots$$

$$pd_{N\ meas}' = pd_{N\ meas} - \beta \cdot \Delta B_{estimated}$$

where $[pd_{i\ meas}'] i \in [2,N]$ are the iono-free pseudo-distances corrected by an estimated inter-frequency bias.

In one embodiment, we can write, using the algebraic value of the first estimate of the inter-frequency bias:

$$pd_{1a\ meas} = pd_1 + (\Delta t_h + B_a) + B_{iono\ 1a} + v_1 a$$

$$pd_{2\ meas}' = pd_2 + (\Delta t_h + B_a) + B_{iono\ avg} - \beta \cdot v_{avg} + v_2$$

$$\ldots$$

$$pd_{N\ meas}' = pd_N + (\Delta t_h + B_a) + B_{iono\ avg} - \beta \cdot v_{avg} + v_N$$

Note moreover that the expression for $pd_{1a\ meas}$ can also be written, by introducing terms in the following manner:

$$pd_{1a\ meas} = pd_1 + (\Delta t_h + B_a) + B_{iono\ avg} - \beta \cdot v_{avg} + v_1 + B_{iono\ 1a} - B_{iono\ avg} + \beta \cdot v_{avg} + (v_{1a} - v_1)$$

$$pd_{1a\ meas} = pd_{1\ meas} + b_{1a}$$

By setting:

$$\Delta t' = \Delta t_h + B_a + B_{iono\ avg} - \beta \cdot v_{avg}$$

$$b_{1a} = B_{iono\ 1a} - B_{iono\ avg} + \beta \cdot v_{avg} + (v_{1a} - v_1)$$

The following expression is obtained $pd_{i\ meas} = pd_i + \Delta t' + v_i$
With the above definition of $pd_{i\ calculated}$, we may write:

$$\begin{bmatrix} pd_{1ameas} - pd_{1calculated} \\ pd_{2meas}' - pd_{2calculated} \\ \vdots \\ pd_{Nmeas}' - pd_{Ncalculated} \end{bmatrix} = \begin{bmatrix} pd_{1meas}' - pd_{1calculated} \\ pd_{2meas}' - pd_{2calculated} \\ \vdots \\ pd_{Nmeas}' - pd_{Ncalculated} \end{bmatrix} + \begin{bmatrix} b_{1a} \\ 0 \\ \vdots \\ 0 \end{bmatrix}$$

-continued $$\begin{bmatrix} pd'_{1ameas} - pd_{1calculated} \\ pd'_{2meas} - pd_{2calculated} \\ \vdots \\ pd'_{Nmeas} - pd_{Ncalculated} \end{bmatrix} =$$

$$\begin{bmatrix} \cos\theta_{1x} & \cos\theta_{1y} & \cos\theta_{1z} & 1 \\ \cos\theta_{2x} & \cos\theta_{2y} & \cos\theta_{2z} & 1 \\ \vdots & \vdots & \vdots & \vdots \\ \cos\theta_{Nx} & \cos\theta_{Ny} & \cos\theta_{Nz} & 1 \end{bmatrix} \begin{bmatrix} x - x_0 \\ y - y_0 \\ \vdots \\ \Delta t' \end{bmatrix} + \begin{bmatrix} v_1 \\ v_2 \\ \vdots \\ v_N \end{bmatrix} + \begin{bmatrix} b_{1a} \\ 0 \\ \vdots \\ 0 \end{bmatrix}$$

This expression can equally be written:

$$\begin{bmatrix} \Delta pd_{1a} \\ \Delta pd'_2 \\ \vdots \\ \Delta pd'_N \end{bmatrix} = \begin{bmatrix} \Delta pd'_1 \\ \Delta pd'_2 \\ \vdots \\ \Delta pd'_N \end{bmatrix} + \begin{bmatrix} b_1 \\ 0 \\ \vdots \\ 0 \end{bmatrix} = H \begin{bmatrix} \Delta x \\ \Delta y \\ \Delta z \\ \Delta t' \end{bmatrix} + \begin{bmatrix} v_1 \\ v_2 \\ \vdots \\ v_N \end{bmatrix} + \begin{bmatrix} b_{1a} \\ 0 \\ \vdots \\ 0 \end{bmatrix}$$

$$\begin{bmatrix} \Delta x_{estimated} \\ \Delta y_{estimated} \\ \Delta z_{estimated} \\ \Delta t_{estimated} \end{bmatrix} = H^* \begin{bmatrix} \Delta pd_{1a} \\ \Delta pd'_2 \\ \vdots \\ \Delta pd'_N \end{bmatrix} = H^* \left( \begin{bmatrix} \Delta pd'_1 \\ \Delta pd'_2 \\ \vdots \\ \Delta pd'_N \end{bmatrix} + \begin{bmatrix} b_{a1} \\ 0 \\ \vdots \\ 0 \end{bmatrix} \right)$$

An error is therefore introduced relative to the situation of "iono-free" measurements, equal to:

$$\begin{bmatrix} \varepsilon x_{estimated} \\ \varepsilon y_{estimated} \\ \varepsilon z_{estimated} \\ \varepsilon t_{estimated} \end{bmatrix} = H^* \begin{bmatrix} b_{a1} \\ 0 \\ \vdots \\ 0 \end{bmatrix}$$

Where:

$$b_{1a} = B_{iono\ 1a} - B_{iono\ avg} + \beta \cdot v_{avg} + \beta \cdot (v_{1b} - v_{1a})$$

The bias introduced on the position is reduced relative to the situation in which single-frequency measurements and "iono-free" measurements are mixed without compensation of the inter-frequency bias because there is no longer present the bias $\Delta B$ multiplied by the coefficient $\beta$, which was the dominant term of the error.

Moreover, the ionospheric error on the single-frequency satellite has been reduced by an amount equal to the average value of the ionospheric error.

The term $B_{iono\ 1a}$ corresponding to the residual ionospheric error has been reduced by the amount $B_{iono\ avg}$.

Another embodiment makes it possible to consider the situation where there is a plurality of single-frequency satellites at least two of which transmit on different frequencies.

In this example, a first single-frequency satellite transmits on the frequency Fa, a second single-frequency satellite transmits on the frequency Fb, and N-2 two-frequency satellites transmit on the frequencies Fa and Fb.

The following equations apply:

$$pd_{1a\ meas} = pd_1 + (\Delta t_h + B_a) + B_{iono\ 1a} + v_{1a}\ \text{Single-frequency satellite a}$$

$$pd_{2b\ meas} = pd_2 + (\Delta t_h + B_a) + \Delta B + B_{iono\ 2b} + v_{2b}\ \text{Single-frequency satellite b}$$

$$pd_{3\ meas} = pd_3 + (\Delta t_h + B_a) + \beta \cdot \Delta B + v_3\ \text{Two-frequency satellite}$$

...

$$pd_{N\ meas} = pd_N + (\Delta t_h + B_a) + \beta \cdot \Delta B + v_N\ \text{Two-frequency satellite}$$

There is presented here the particular case where only the satellites 1 and 2 are single-frequency satellites, respectively using the frequencies Fa and Fb. The equations are simplified compared to a situation in which there is a greater number of single-frequency satellites.

In variants of the invention in which a plurality of single-frequency satellites is to be taken into consideration in the resolution of the position of a GNSS receiver, the invention is applied by adapting the equations set out hereinafter in the description.

In one calculation mode, the estimated bias is compensated on the two-frequency measurements and on the frequency Fb. It would amount to the same thing to compensate the error on the two-frequency measurements and on the frequency Fa.

The following equations are obtained:

$$pd_{1a\ meas} = Pd_{1a\ meas}$$

$$pd_{2b\ meas}' = pd_{2b\ meas} - \Delta B_{estimated}$$

$$pd_{3\ meas}' = pd_{3\ meas} - \beta \cdot \Delta B_{estimated}$$

...

$$pd_{N\ meas}' = pd_{N\ meas} - \beta \cdot \Delta B_{estimated}$$

where $pd_{2bmeas}'$ is a pseudo-distance measured between the second satellite and the receiver when the signal is carried by the frequency Fb; and
where $[pd_{i\ meas}']i \in [2,N]$ are the iono-free pseudo-distances corrected by an estimated inter-frequency bias.
Whence:

$$pd_{1a\ meas} = pd_1 + (\Delta t_h + B_a) + B_{iono\ 1a} + v_{1a}$$

$$pd_{2b\ meas}' = pd_2 + (\Delta t_h + B_a) + B_{iono\ 2b} + 1/\beta \cdot B_{iono\ avg} - v_{avg} + v_{2b}$$

$$pd_{3\ meas}' = pd_3 + (\Delta t_h + B_a) + B_{iono\ avg} - \beta \cdot v_{avg} + v_3$$

...

$$pd_{N\ meas}' = pd_N + (\Delta t_h + B_a) + B_{iono\ avg} - \beta \cdot v_{avg} + v_N$$

Note moreover that $pd_{1a\ meas}$ can be written:

$$pd_{1a\ meas} = pd_1 + (\Delta t_h + B_a) + B_{iono\ avg}\beta \cdot v_{avg} + v_1 + B_{iono\ 1a} - B_{iono\ avg} + \beta \cdot v_{avg} + (v_{1a} - v_1)$$

This equation can equally be written:

$$pd_{1a\ meas} = pd_{1\ meas}' + b_1 a$$

where:

$$pd_{1\ meas}' = pd_1 + (\Delta t_h + B_a) + B_{iono\ avg}\beta \cdot v_{avg} + v_1$$

$$b_{1a} = B_{iono\ 1a} - B_{iono\ avg} + \beta \cdot v_{avg} + (v_{1a} - v_1)$$

Note also that $pd_{1a\ meas}$ can be written:

$$pd_{2b\ meas}' = pd_2 + (\Delta t_h + B_a) + B_{iono\ avg} - \beta \cdot v_{avg} + v_2 + B_{iono\ 2b} - (1 - 1/\beta) \sim B_{iono\ avg} + (\beta - 1) \cdot v_{avg} + (v_{1a} - v_1)$$

This equation can also be written:

$$pd_{2b\ meas}' = pd_{2\ meas}' + b_2 b$$

where:

$$pd_{2\ meas}' = pd_2 + (\Delta t_h + B_a) + B_{iono\ avg} - \beta \cdot v_{avg} + v_2$$

$$b_{2b} = B_{iono\ 2b} - (\alpha/\beta) \cdot B_{iono\ avg} - \alpha \cdot v_{avg} + (v_{1a} - v_1)$$

The same terms are found in $b_{1a}$ and $b_{2b}$ with slightly different coefficients.

The error in the position becomes:

$$\begin{bmatrix} \varepsilon x_{estimated} \\ \varepsilon y_{estimated} \\ \varepsilon z_{estimated} \\ \varepsilon t_{estimated} \end{bmatrix} = H^* \begin{bmatrix} b_{1a} \\ 0 \\ 0 \\ \vdots \\ 0 \end{bmatrix} + H^* \begin{bmatrix} 0 \\ b_{1b} \\ 0 \\ \vdots \\ 0 \end{bmatrix}$$

The correction of the inter-frequency bias can be compensated before or after the iono-free combination.

Note that in the residual uncorrected error terms $b_{1a}$ and $b_{2b}$, the dominant term relating to $\beta \cdot \Delta B_{HF}$ has been eliminated.

Moreover, the errors linked to the ionospheric delay, respectively $B_{iono\ 1a}$ and $B_{iono\ 2b}$, in each of the equations are respectively reduced by $B_{iono\ avg}$ and $(\alpha/\beta) \cdot B_{iono\ avg}$.

Figure 3:
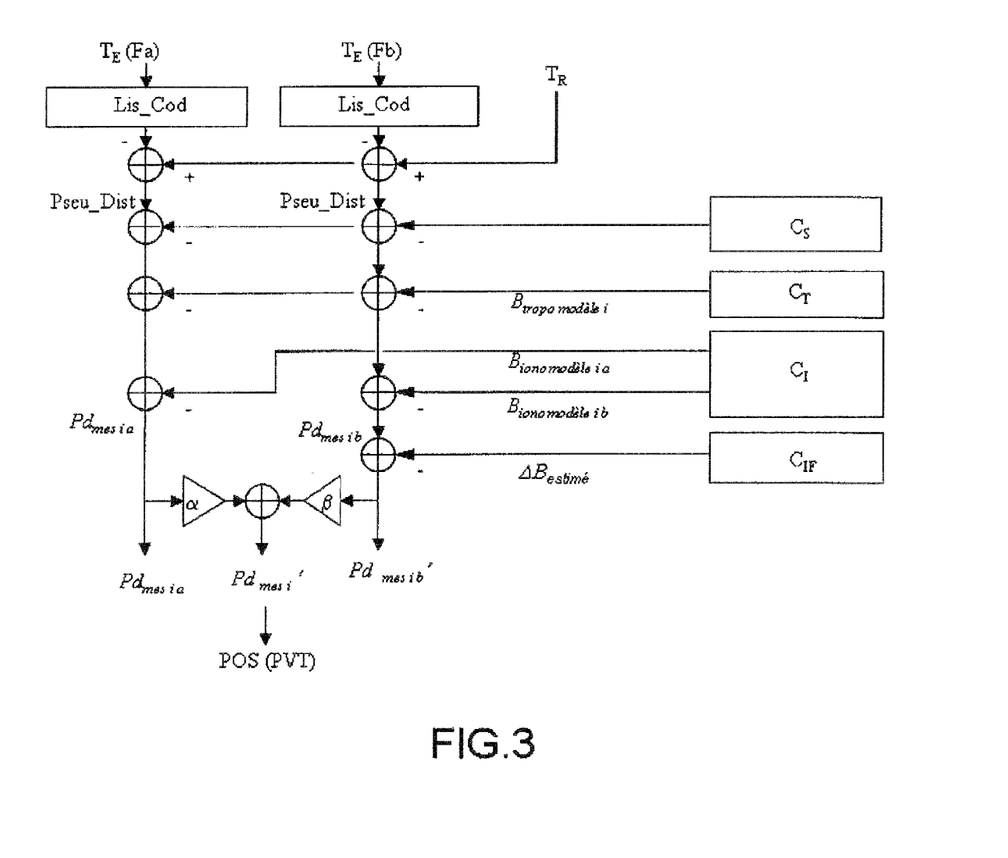
FIG. 3 shows the order of the corrections applied by a GNSS receiver of the invention to the measurements of the signals received.

FIG. 3 represents the order of the corrections, notably that of the correction of the inter-frequency bias in the HF channel, which in a variant can intervene before or after the iono-free combination.

FIG. 3 represents the calculations effected on the measurements of a first signal received from a satellite at the current time t on a frequency Fa the transmission time of which measured at the current time t is denoted $T_E(Fa)$ and a second signal received from the same satellite at the current time t on a frequency Fb the transmission time of which measured at the current time t is denoted $T_E(Fb)$. The receiver effects a step of smoothing the transmission time measurements, denoted Sm_Cod, using the carrier phase measurements on the frequencies Fa and Fb. The measured transmission times $T_E(Fa)$ and $T_E(Fb)$ are subtracted from the measured reception time $T_R$ to produce measured pseudo-distances Pseudo_Dist on the frequencies Fa and Fb, respectively.

The GNSS receiver effects a first series of corrections Cs including the correction of system errors; where appropriate, depending on the embodiment, this first series of corrections can include correction of the Sagnac effect, correction of the clock drift of each satellite, and finally relativistic effects.

Pseudo-distance measurements are obtained after a first set of corrections Cs.

A second series of compensations $C_T$ is effected on the received signals. The compensation $C_T$ corrects the errors linked to the tropospheric delays by the introduction of a compensation bias, denoted $B_{tropo-model-i}$, that is calculated on the basis of a model.

Finally, the ionospheric delays are corrected by a third series of corrections $C_I$. A compensation bias $B_{iono\ model\ i}$ in the processing of the signals, notably in the processing of each of the carriers Fa and Fb, is introduced to compensate the ionospheric delays.

Finally, the invention proposes to introduce a bias for compensating the inter-frequency measurements $\Delta B_{estimated}$ in such a manner as to correct the HF inter-channel bias $\Delta B_{HF}$.

The compensation $C_{IF}$ makes it possible to introduce a correction of the inter-frequency measurements in the HF channels of the receiver. Depending on the embodiment, the compensation $C_{IF}$ can be effected:
  either on the measurements of the two-frequency pseudo-distances before the calculation of the iono-free pseudo-distances;
  or on the measurements of the iono-free pseudo-distances.

FIG. 3 represents the situation in which the corrections are effected on the upstream side of the calculation of the iono-free pseudo-distances between the satellites the GNSS receiver. In other words, the corrections are effected on the measurements of the pseudo-distances $pd_{meas\ ib}$ and $pd_{meas\ ia}$ before they are combined in order to obtain the iono-free pseudo-distances $pd_{meas\ i}$ between each satellite and the receiver.

In the FIG. 3 example, the compensation $\Delta B_{estimated}$ applied to the calculation of the pseudo-distances makes it possible to obtain the measurement of the pseudo-distance $pd_{meas\ ib}'$ from the measurement $pd_{meas\ ib}$.

The following equation expresses the compensated pseudo-distance:

$$pd_{meas\ ib}' = pd_{meas\ ib} - \Delta B_{estimated}$$

In the FIG. 3 example, the correction is effected on the pseudo-distance measured at the frequency Fb before the calculation of the iono-free pseudo-distances. These iono-free pseudo-distances are calculated from measurements of the pseudo-distance $pd_{meas\ ia}$ and the corrected pseudo-distance $pd_{meas\ ib}'$.

The position POS(PVT) is then determined after taking into account all corrections of compensation in the receiver on the basis of calculating the iono-free pseudo-distances $Pd_{meas\ i}'$.

In another embodiment of the invention the compensation linked to the corrections of the inter-frequency bias is effected on the single-frequency measurements.

In the situation where only one single-frequency satellite is sending a signal to the GNSS receiver among the received two-frequency signals, the following equations apply:

$$pd_{1a\ meas}'' = pd_{1a\ meas} + \beta \cdot \Delta B_{estimated}$$

$$pd_{2\ meas} = pd_{2\ meas}$$

$$\cdots$$

$$pd_{N\ meas} = pd_{N\ meas}$$

$pd_{1a\ meas}''$ denotes the measurement of the corrected single-frequency pseudo-distance on the frequency Fa.

In the situation where a plurality of single-frequency satellites are sending a signal to the GNSS receiver, the latter receiver then receives two-frequency and single-frequency signals.

In this latter example, only the satellites 1 and 2 are single-frequency satellites.

The following equations apply:

$$pd_{1a\ meas}'' = pd_{1a\ meas} + \beta \cdot \Delta B_{estimated}$$

$$pd_{2b\ meas}'' = pd_{2b\ meas} - \Delta B_{estimated} + \beta \cdot \Delta B_{estimated}$$

$$pd_{3\ meas} = pd_{3\ meas}$$

$$\cdots$$

$$pd_{N\ meas} = pd_{N\ meas}$$

The remainder of the description covers in detail variants of the invention, notably ways of correcting ionospheric errors or "system" errors occurring on the upstream side of correction of the inter-frequency bias of the HF channels of the receiver.

One embodiment of the invention makes it possible to correct the ionospheric error by taking into account a predefined model as well as correcting the inter-frequency bias in the HF channels.

Provided that iono-free two-frequency measurements are available, the elimination of the ionospheric biases can be considered perfect and the error models, such as the models known under the names "Klobuchar" and "Nequick", are of no utility.

On the other hand, in the context of the invention, the GNSS receiver receives mono-frequency and two-frequency signals coming from a set of satellites and when resolving the position it is preferable in a preferred variant of the invention to apply the ionospheric corrections to the single-frequency measurements.

In this case, the inter-frequency bias must be estimated from measurements on the frequencies Fa and Fb after application of the ionospheric corrections supplied by the error model.

This solution makes it possible to avoid re-introducing the average ionospheric error into the single-frequency measurements.

The foregoing equations can be expressed with the ionospheric delay $B_{iono\ x}$ replaced by $B_{iono\ residual\ i\ x}$.

$B_{iono\ residual\ i\ x}$ denotes the delay residue after application of the correction supplied by the error module.

The following equation applies:

$$B_{iono\ residual\ i\ x} = B_{iono\ i\ x} - B_{iono\ model\ i\ x}$$

The following equation still applies:

$$F_a^2 \cdot B_{iono\ residual\ i\ a} - F_b^2 \cdot B_{iono\ residual\ i\ b} = 0$$

And by construction:

$$F_a^2 \cdot B_{iono\ model\ i\ a} - F_b^2 \cdot B_{iono\ model\ i\ b} = 0$$

Another embodiment makes it possible to correct the "system" errors taking into account a model as well as, in one embodiment of the invention, correcting the inter-frequency bias in the HF channels.

The satellite measurements are affected by "system" errors independent of the receiver, caused by inaccuracies in the satellite clock and ephemeris corrections and atmospheric delays when the signal passes through the ionosphere and the troposphere.

The invention makes it possible to distinguish:
on the one hand, system errors independent of frequency such as satellite clock errors, ephemeris errors or errors linked to passing through the troposphere; and
on the other hand, ionospheric errors depending on frequency and easily eliminated using the two-frequency measurements.

Some of the delays caused by the troposphere can be eliminated using an error model. In the invention, it is considered that the "system" measurement errors include the residue of the tropospheric error after correction.

The single-frequency measurements yield the following measurement noise:

$$v_{ia} = v_{i\ system} + v_{i\ a\ receiver}$$

$$v_{ib} = v_{i\ system} + v_{i\ b\ receiver}$$

The iono-free two-frequency measurements yield the following measurement noise:

$$v_i = \alpha \cdot v_{ia} + \beta \cdot v_{ib} = v_{i\ system} + \alpha \cdot v_{ia\ receiver} + \beta \cdot v_{ib\ receiver}$$

With the following notation:
$v_{i\ system}$ is the measurement error caused by the system excluding the ionospheric delay, such as the satellite clock bias, the ephemeris error or the tropospheric bias residue after correction. These errors are common to the two frequencies Fa and Fb.
$v_{i\ x\ receiver}$ is the measurement error caused by the receiver, such as thermal noise, at the frequency x where x=a or b.
The measurement noise variance can then be calculated.
The following equations apply to the single-frequency measurements:

$$\sigma_{ia}^2 = var[v_{ia}] = var[v_{system}] + var[v_{receiver\ i\ a}] = \sigma_{system}^2 + \sigma_{receiver\ i\ a}^2$$

$$\sigma_{ib}^2 = var[v_{ib}] = var[v_{system}] + var[v_{receiver\ i\ b}] = \sigma_{system}^2 \sigma_{receiver\ i\ b}^2$$

$$\sigma_{system}^2 = var[v_{system}] = (6\ m)^2 \text{ in the GPS case}$$

$$\sigma_{receiver\ i\ x}^2 = var[v_{receiver\ i\ x}] = \lambda_{codex}^2 \frac{\delta_b}{2} \frac{B_{DLL}}{2C/N_{0 \times i}} \left(1 + \frac{B_{FI}}{C/N_{0 \times i}}\right)$$

$\lambda_{code\ x}$: Length of an element of the spreading code at the frequency x with x=a or b;
$\delta x$: Space between the advance and retard correlators in the code loop;
$B_{DLL}$: Mono-lateral bandwidth of the code loop DLL (delay lock loop);
$B_{FI}$: Pre-detection band in the code loop;
C/N0 x i: Estimated signal-to-noise ratio at the frequency x, with x=a or b, for satellite i.

The variance of the measurement noise on the "iono-free" two-frequency signals is obtained from the following equation:

$$\sigma^2 = var[v_i] = \sigma_{system}^2 + \alpha^2 \cdot \sigma_{receiver\ i\ a}^2 + \beta^2 \cdot \sigma_{receiver\ i\ b}^2$$

Two situations arise if account is taken of the correction to the iono-free two-frequency measurements, i.e. the measurements compensated by the correction.

In a first situation, if there are no single-frequency measurements, the estimated correction $\beta \cdot \Delta B$ being the same for all the two-frequency measurements, the $\Delta B$ estimation error can be considered to have no effect on the resolution of the position and thus can be ignored.

In a second situation, if single-frequency measurements are introduced into the calculation, it is necessary to consider the variance on the two-frequency measurement bias introduced by the single-frequency measurements.

The following equations are obtained when considering the two-frequency measurement bias:

$$pd_{1a\ meas}' = pd_1 + \Delta t' + B_{iono\ residual\ 1\ a} - B_{iono\ residual\ avg} + \beta \cdot v_{avg} + v_1 a$$

$$pd_{2b\ meas}' = pd_2 + \Delta t' + B_{iono\ residual\ 2\ a} + (\alpha/\beta) \cdot B_{iono\ residual\ avg} \alpha \cdot v_{avg} + v_2 b$$

$$pd_{3\ meas}' = pd_3 + \Delta t' + v_3$$

$$\ldots$$

$$pd_{N\ me}' = pd_N + \Delta t' + v_N$$

With $\Delta t' = \Delta t_h + B_a + B_{iono\ residual\ avg} - \beta \cdot v_{avg}$
In this situation, what is of interest is the variance of the errors not common to the satellites, i.e. excluding $\Delta t'$.

The following equations can then be written:

$$var[pd_{1a\ meas}'-\Delta t']=var[B_{iono\ residual\ i\ a}]+$$
$$var[B_{iono\ residual\ avg}]+\beta^2\cdot var[v_{avg}]+var[v_1a]$$

$$var[pd_{2bmeas}'-\Delta t']=var[B_{iono\ residual\ 2}b]+(\alpha/\beta)^2\cdot var$$
$$[B_{iono\text{-}residual\text{-}avg}]+\alpha^2\cdot var[v_{avg}]+var[v_2b]$$

$$var[pd_{3meas}'-\Delta t']=var[v_3]$$

$$var[pd_{Nmeas}'-\Delta t']=var[v_N]$$

$$var[B_{iono\ residual\ i\ a}]=\sigma_{iono\ a}^2/4$$

$$var[B_{iono\ residual\ i\ b}]=(\alpha/\beta)^2\cdot\sigma_{iono\ a}^2/4$$

Note that:
var[$B_{iono\ residual\ avg}$] is negligible because there is a large number of measurements and the ionospheric correction model is assumed not to be biased.
var[$v_{avg}$] is negligible for the same reasons.
Where var[$B_{iono\ residual\ i\ a}$] is concerned, the model corrects 50% of the standard deviation error.
There are finally obtained:

$$\sigma_{ia}'^2=var[pd_{1a\ meas}'-\Delta t']=\sigma_{iono\ a}^2\cdot(0.50)^2\sigma_{system}^2+$$
$$\sigma_{receiver\ i\ a}^2$$

$$\sigma_{ib}'^2=var[pd_{2b\ meas}'-\Delta t]=(\alpha/\beta)^2\cdot\sigma_{iono\ b}^2\cdot(0.50)^2+$$
$$\sigma_{system}^2+\sigma_{receiver\ i\ b}^2$$

$$\sigma_i'^2=var[pd_{3\ meas}\Delta t']=\sigma_{system}^2\alpha^2\cdot$$
$$\sigma_{receiver\ i\ a}^2+\beta^2\sigma_{receiver\ i\ b}^2$$

The invention makes it possible to resolve the solution of the foregoing equations by least squares weighting.

To minimize the error on the resolved position, account is taken of the diluted precision of the single-frequency measurements compared to the two-frequency measurements in weighting the pseudo-distance measurements.

The following matrix applies:

$$W=\begin{bmatrix} 1/\sigma_{1a}'^2 & 0 & \ldots & \ldots & 0 \\ 0 & 1/\sigma_{2b}'^2 & 0 & \ldots & \vdots \\ \vdots & 0 & 1/\sigma_3^2 & 0 & \vdots \\ \vdots & \ldots & 0 & \ldots & 0 \\ 0 & \ldots & \ldots & 0 & 1/\sigma_N^2 \end{bmatrix}$$

One advantage of the invention is that this principle can be applied to the mixture of satellite measurements coming from different constellations, notably GPS and Galileo.

The Galileo measurements on L1 are, compared to the GPS measurements on L1, affected by a bias equal to the difference between the Galileo system time and the GPS system time plus the propagation time difference between a Galileo signal and a GPS signal in the band L1 of the receiver.

This is called the Galileo to GPS time offset (GGTO).

The GPS and Galileo signals do not have the same spectrum, and therefore have different propagation times.

The Galileo measurements on E5, also denoted E5b, compared to the GPS measurements on L1, are affected by a bias equal to the system time difference plus the propagation time difference between a Galileo signal in the E5b band of the receiver and a GPS signal in the L1 band.

The same principle is used to identify these two biases. In this case, identifying the biases entails the calculation of the resolution of the position:

$$\begin{bmatrix} pd_{iL1GPSmeas} - pd_{icalculated} \\ pd_{jL5GPSmeas} - pd_{jcalculated} \\ pd_{kL1Galmeas} - pd_{kcalculated} \\ pd_{lE5Galmeas} - pd_{lcalculated} \end{bmatrix} =$$

$$\begin{bmatrix} \cos\theta_{ix} & \cos\theta_{iy} & \cos\theta_{iz} & 1 & 0 & 0 & 0 \\ \cos\theta_{jx} & \cos\theta_{jy} & \cos\theta_{jz} & 1 & 1 & 0 & 0 \\ \cos\theta_{k,x} & \cos\theta_{ky} & \cos\theta_{kz} & 1 & 0 & 1 & 0 \\ \cos\theta_{lx} & \cos\theta_{ly} & \cos\theta_{lz} & 1 & 0 & 0 & 1 \end{bmatrix} \begin{bmatrix} x-x_0 \\ y-y_0 \\ z-z_0 \\ \Delta t \\ \Delta B_1 \\ \Delta B_2 \\ \Delta B_3 \end{bmatrix} + \begin{bmatrix} v_i \\ v_j \\ v_k \\ v_l \end{bmatrix}$$

$$\begin{bmatrix} \Delta pd_{iL1GPSmeas} \\ \Delta pd_{jL5GPSmeas} \\ \Delta pd_{kL1Galmeas} \\ \Delta pd_{lE5Galmeas} \end{bmatrix} = H \begin{bmatrix} \Delta x \\ \Delta y \\ \Delta z \\ \Delta t \\ \Delta B_1 \\ \Delta B_2 \\ \Delta B_3 \end{bmatrix} + \begin{bmatrix} v_i \\ v_j \\ v_k \\ v_l \end{bmatrix}$$

$\Delta B_1$: Bias between a GPS signal on L5 and a GPS signal on L1

$\Delta B_2$: Bias between a Galileo signal on L1 and a GPS signal on L1

$\Delta B_3$: Bias between a Galileo signal on E5 and a GPS signal on L1

Resolving by least squares:

$$\begin{bmatrix} \Delta x_{provisional\ estimate} \\ \Delta y_{provisional\ estimate} \\ \Delta z_{provisional\ estimate} \\ \Delta t_{provisional\ estimate} \\ \Delta B_{1estimated}(n) \\ \Delta B_{2estimated}(n) \\ \Delta B_{3estimated}(n) \end{bmatrix} = H^* \begin{bmatrix} \Delta pd_{iL1GPSmeas}(n) \\ \Delta pd_{jL5GPSmeas}(n) \\ \Delta pd_{kL1Galmeas}(n) \\ \Delta pd_{lE5Galmeas}(n) \end{bmatrix}$$

with $H^* = (H^T W^T W H)^{-1} H^T W^T$ and $$W = \begin{bmatrix} 1/\sigma_{iL1GPS}^2 & 0 & \ldots & 0 \\ 0 & 1/\sigma_{jL5GPS}^2 & 0 & \vdots \\ \vdots & 0 & 1/\sigma_{kL1Gal}^2 & 0 \\ 0 & \ldots & 0 & 1/\sigma_{lE5Gal}^2 \end{bmatrix}$$

The estimated biases are then filtered:

$$\Delta B_{q\ filtered\ estimate}(n) \stackrel{def}{=}$$
$$\left(1-\frac{1}{\tau}\right)\Delta B_{q\ filtered\ estimate}(n-1) + \frac{1}{\tau}\Delta B_{q\ estimated}(n) \text{ for } q=1,2,3$$

Simple averaging can also be effected $$\Delta B_{q\ filtered\ estimate}(n) \overset{def}{=} \frac{1}{N} \sum_{k=n-N+1}^{k=n} \Delta B_{q\ estimated}(k)$$

for q=1, 2, 3:

Finally, the GPS L5 and Galileo L1 & E5 measurements are corrected and the GPS/Galileo position resolved.

The inter-frequency bias correction can be compensated before or after the iono-free combination.

Figure 4:
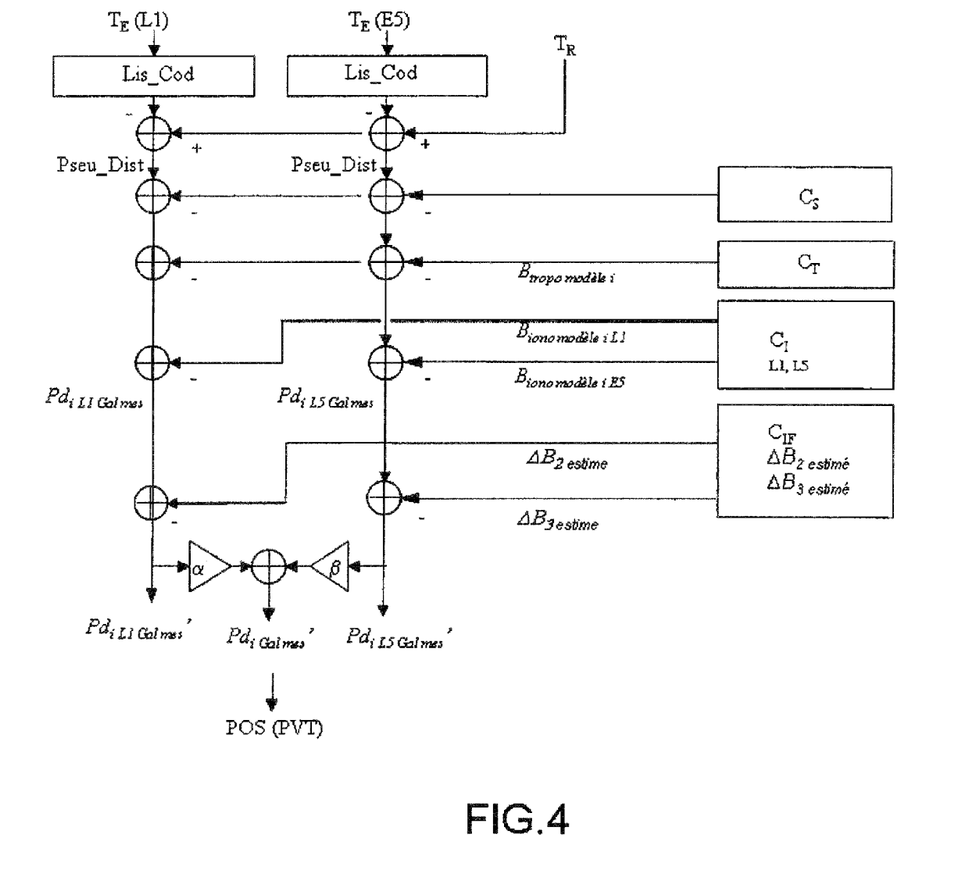
FIG. 4 shows the order of the corrections applied by a GNSS receiver of the invention to the measurements of the signals received by two different constellations.

FIG. 4 represents the order of the corrections to the signals received by the receiver, notably the correction of the inter-frequency bias that can, in a different embodiment be effected before the iono-free combination.

FIG. 4 represents the order of the corrections in a GNSS receiver when a first received signal comes from a satellite of a GPS first constellation and a second received signal comes from a satellite of a Galileo second constellation, for example.

The receiver applies a step of smoothing the transmission time measurements, denoted Sm_Cod, using the carrier phase measurements at the frequencies L1 and E5. The transmission times $T_E(L1)$ and $T_E(E5)$ measured at the frequencies L1 and E5 are subtracted from the measured reception time $T_R$ to produce pseudo-distances respectively measured at the frequencies L1 and E5.

The GNSS receiver effects the corrections Cs, $C_T$, $C_I$ as described above (see FIG. 3). A compensation bias $\beta_{iono\ model\ i\ x}$ in the processing of the signals, notably of each of the carriers E5 and L1, is introduced to compensate the ionospheric delays in each path. At this step of the correction process there are obtained the pseudo-measurements $Pd_{i\ L1\ Gal\ meas}$ and $Pd_{i\ L5\ Gal\ meas}$) respectively, on each of the paths.

Finally, the invention proposes to introduce a bias for compensation of the inter-frequency measurements $\Delta B_{2\ estimated}$ and $\Delta B_{3\ estimated}$ to correct the HF inter-channel bias $\Delta B_{HF}$ on each of the paths of the GNSS receiver.

The corrections $C_{IF}$ make it possible to introduce this latter compensation into the measurements of the pseudo-distances. By introducing an inter-frequency measurement compensation bias, the corrections can then be effected, depending on the embodiment:

either on the measurements of the two-frequency pseudo-distances;

or on the measurements of the iono-free pseudo-distances.

After correction there are obtained the magnitudes relating to a pseudo-distance $pd_{i\ L1\ Gal\ meas}'$ and $pd_{i\ L5\ Gal\ meas}'$. These two compensated and combined pseudo-distances then make it possible to obtain the iono-free pseudo-distance $pd_{i\ Gal\ meas}'$. The resolution of the position of the receiver is then obtained from the combination of at least four measured pseudo-distances.

FIG. 4 represents the situation in which the corrections are effected upstream of the calculation of the iono-free pseudo-distances between the satellites and the GNSS receiver.

The position POS(PVT) is then determined after account is taken of all the compensation corrections in the receiver based on the calculation of the iono-free pseudo-distances.

The invention claimed is:

1. Method for determining the position of a mobile Global Navigation Satellite System GNSS receiver including a means for receiving at least two frequencies and using at least four satellites, comprising the following steps:

a. transmitting a first signal on a first frequency from a first satellite, b. transmitting two-frequency signals, denoted second and third signals respectively, on the first frequency and on a second frequency respectively, from a plurality of second satellites, each second satellite transmitting a second and a third signal, c. determining the position of the mobile GNSS receiver by:
  i. calculating at least four measured pseudo-distances corresponding to the distances between each satellite and the mobile GNSS receiver,
  ii. calculating an average estimated inter-frequency bias denoted $\Delta B_{estimated}$, between the second and third signals received in HF channels of the receiver, using the following equation:

$$\Delta B_{estimated} \overset{def}{=} \frac{1}{(N-1)} \sum_{i=2}^{N} (pd_{ibmeas} - pd_{iameas})$$

where $i \in [2, N]$ are second satellites and N−1 is the number of second satellites and $pd_{ia\text{-}meas}$ is a pseudo-distance between a second satellite i and the mobile GNSS receiver measured on the first frequency and $pd_{ib\text{-}meas}$ is a pseudo-distance between the second satellite i and the mobile GNSS receiver measured on the second frequency, iii. correcting first-measured pseudo-distances, also called single-frequency pseudo-distances that correspond to measured pseudo-distances between the first satellite and the receiver, using the average estimated inter-frequency bias denoted ΔBestimated.

2. Method according to claim 1, further comprising a step of calculating a filtered average estimated inter-frequency bias denoted $\Delta B_{filtered}$ estimate between second and third signals received by the receiver using the following equation:

$$\Delta B_{filtered\ estimate}(n) \overset{def}{=} \left(1 - \frac{1}{\tau}\right) \Delta B_{filtered\ estimate}(n-1) + \frac{1}{\tau} \Delta B_{estimated}(n),$$

where τ is a time constant and where n is a sampling index with a period less than the correlation of the ionospheric delay.

3. Method according to claim 1 further comprising:

a. calculating a corrective factor equal to the product of the estimated inter-frequency bias $\Delta B_{estimated}$ and of a first constant β, the first constant being equal to a ratio between the square of a second frequency Fa divided by the difference between the squares of the first Fa and second Fb frequencies $\beta = F_b^2/(F_b^2 - F_a^2)$.

4. Method according to claim 3, further comprising:

correcting second measured pseudo-distances, also called two frequency pseudo-distances, corresponding to the measured pseudo-distances calculated for the second satellites using the second measured pseudo-distances, each iono-free pseudo-distance being equal, for each second satellite, to:

$$pd_{i\text{-}meas} = (F_a^2 \cdot pd_{ia\text{-}meas} - F_b^2 \cdot pd_{ib\text{-}meas})/(F_a^2 - F_b^2).$$

5. Method according to claim 3, wherein correcting second measured pseudo-distances comprises defining, for each second satellite, a corrected pseudo-distance that is equal to the value of the iono-free pseudo-distance less the corrective factor, 6. Method according to claim 3 using at least four satellites of which at least one third satellite transmitting a fourth signal on the second frequency, further comprising:
   a. a first definition, for each second satellite, of a corrected pseudo-distance that is equal to the value of the iono-free pseudo-distance less the corrective factor; and
   b. a second definition, for the third satellite, of a corrected pseudo-distance that is equal to the value of the measured pseudo-distance between the third satellite and the receiver less the value of the estimated inter-frequency bias.

7. Method according to claim 1 or 2, using at least four satellites of which at least one third satellite transmitting a fourth signal on the second frequency, further comprising:
   a. a third definition, for the first satellite, of a corrected pseudo-distance that is equal to the value of the measured pseudo-distance between the first satellite and the receiver at the first frequency plus a corrective factor that is equal to the product of the estimated inter-frequency bias $\Delta B_{estimated}$ and of a first constant $\beta$, the first constant being equal to the ratio between the square of the second frequency Fa divided by the difference between the squares of the first Fa and second Fb frequencies $\beta = F_b^2/(F_b^2 - F_a^2)$; and
   b. a fourth definition, for the third satellite, of a corrected pseudo-distance that is equal to the value of the measured pseudo-distance at the second frequency between the third satellite and the receiver:
   c. plus the corrective factor; and
   d. less the value of the estimated inter-frequency bias.

* * * * *